United States Patent
Rafey et al.

(10) Patent No.: US 11,321,141 B2
(45) Date of Patent: May 3, 2022

(54) RESOURCE MANAGEMENT FOR SOFTWARE CONTAINERS USING CONTAINER PROFILES

(71) Applicant: Dell Products L.P., Round Rock, TX (US)

(72) Inventors: Mohammad Rafey, Bangalore (IN); Siddharth Agrawal, Sambalpur (IN)

(73) Assignee: Dell Products L.P., Round Rock, TX (US)

( * ) Notice: Subject to any disclaimer, the term of this patent is extended or adjusted under 35 U.S.C. 154(b) by 208 days.

(21) Appl. No.: 16/576,983

(22) Filed: Sep. 20, 2019

(65) Prior Publication Data

US 2021/0089361 A1 Mar. 25, 2021

(51) Int. Cl.
*G06F 9/50* (2006.01)
*G06N 20/00* (2019.01)
*G06F 9/455* (2018.01)

(52) U.S. Cl.
CPC ........ *G06F 9/5077* (2013.01); *G06F 9/45558* (2013.01); *G06F 9/505* (2013.01); *G06N 20/00* (2019.01); *G06F 2009/45595* (2013.01)

(58) Field of Classification Search
CPC .... G06F 9/5077; G06F 9/45558; G06F 9/505; G06F 2009/45595; G06N 20/00
See application file for complete search history.

(56) References Cited

U.S. PATENT DOCUMENTS

| 10,698,925 | B1 * | 6/2020 | Zhao ...................... G06F 9/455 |
| 2011/0247005 | A1 | 10/2011 | Benedetti et al. |
| 2013/0304925 | A1 | 11/2013 | Ferris et al. |
| 2017/0126506 | A1 | 5/2017 | Padala |
| 2019/0171811 | A1 * | 6/2019 | Daniel .................. G06F 9/5077 |
| 2020/0236119 | A1 * | 7/2020 | Chamarajnager ... G06F 9/45558 |
| 2021/0034537 | A1 * | 2/2021 | Shuster ................. G06F 3/0611 |

(Continued)

OTHER PUBLICATIONS

U.S. Appl. No. 16/402,335 filed in the name of Mohammad Rafey et al. filed May 3, 2019 and entitled "Dynamic Source Code Entities Categorization and Ranking Based on Basis Path and Graph Linkages."

*Primary Examiner* — Jacob D Dascomb
(74) *Attorney, Agent, or Firm* — Ryan, Mason & Lewis, LLP

(57) ABSTRACT

A method comprises receiving a request to execute an instance of a given software container, determining source code entities of source code of the given software container, and generating a given software container profile for the given software container based at least in part on rankings associated with the source code entities. The method also comprises creating a resource management plan for the given software container utilizing one or more machine learning algorithms, the resource management plan comprising resource management metric thresholds determined based at least in part on historical resource utilization data for additional software containers having associated software container profiles similar to the given software container profile. The method further comprises executing the instance of the given software container on a software container platform, and managing resource utilization of the executing instance of the given software container based at least in part on the resource management plan.

20 Claims, 13 Drawing Sheets

(56) References Cited

U.S. PATENT DOCUMENTS

| | | | |
|---|---|---|---|
| 2021/0055918 A1* | 2/2021 | Dayanandan | G06F 8/10 |
| 2021/0073021 A1* | 3/2021 | Faulhaber, Jr | G06F 9/455 |
| 2021/0081182 A1* | 3/2021 | Seshadri | G06F 11/302 |

* cited by examiner

501

| CODE RANKING LIST | |
|---|---|
| CLASS 10 | 1 |
| CLASS 03 | 2 |
| CLASS 02 | 3 |
| CLASS 14 | 4 |
| CLASS 05 | 5 |
| CLASS 13 | 6 |
| CLASS 07 | 7 |
| CLASS 15 | 8 |
| CLASS 09 | 9 |
| CLASS 01 | 10 |
| CLASS 11 | 11 |
| CLASS 12 | 12 |
| CLASS 06 | 13 |
| CLASS 04 | 14 |
| CLASS 08 | 15 |
| CLASS 20 | 16 |
| CLASS 22 | 17 |
| CLASS 21 | 18 |
| CLASS 24 | 19 |
| CLASS 23 | 20 |
| CLASS 25 | 21 |
| CLASS 27 | 22 |
| CLASS 26 | 23 |
| CLASS 30 | 24 |

503

| PERCENTILE WEIGHT COEFFICIENTS | |
|---|---|
| TOP 25% | X |
| TOP 26%-50% | Y |
| BOTTOM 50% | Z |

505

CONTAINER PROFILE WEIGHT

A = NUMBER OF ENTITIES WITH X WEIGHT
B = NUMBER OF ENTITIES WITH Y WEIGHT
C = NUMBER OF ENTITIES WITH Z WEIGHT $$\text{FINAL WEIGHT} = \frac{(A*X) + (B*Y) + (C*Z)}{A+B+C}$$

507

SAMPLE CALCULATIONS
ASSUMPTION: $X = 10, Y = 5, Z = 2$

| | CONTAINER 1 | CONTAINER 2 |
|---|---|---|
| A | 34 | 5 |
| B | 55 | 200 |
| C | 109 | 150 |
| FINAL WEIGHT | 833 | 1350 |

FIG. 5

| DATE | CONTAINER INSTANCE IDENTIFIER | PROFILE WEIGHT | MAX CPU USAGE (%) | MAX STORAGE SPACE USED (MB) | MAX MEMORY USAGE (MB) |
|---|---|---|---|---|---|
| 20080501T08:30:52Z | 1 (462C-B1E7-615199A92463) | 800 | 66 | 300 | 23 |
| 20080501T08:31:52Z | 2 (4355-AF90-BFA961E2F60D) | 650 | 34 | 230 | 45 |
| 20080501T08:31:62Z | 3 (4ED6-98FC-241B3BCF2171) | 320 | 56 | 100 | 67 |
| 20080501T08:30:52Z | 4 (4D89-A2C5-C568ABD09BB3) | 1000 | 78 | 453 | 23 |
| 20080501T08:30:52Z | 5 (41D7-88E1-DD27D8F457C4) | 120 | 66 | 23 | 87 |
| 20080501T08:30:52Z | 6 (4341-91E9-B0031F432FC2) | 478 | 43 | 456 | 98 |
| 20080501T08:30:52Z | 7 (4D61-B1DD-F0EB6E9C2E14) | 340 | 98 | 43 | 234 |
| 20080501T08:40:52Z | 1 (462C-B1E7-615199A92463) | 800 | 90 | 76 | 435 |
| 20080501T08:30:52Z | 3 (4ED6-98FC-241B3BCF2171) | 320 | 100 | 678 | 23 |
| 20080501T08:60:52Z | 4 (4D89-A2C5-C568ABD09BB3) | 1000 | 32 | 670 | 43 |
| 20080501T08:30:52Z | 5 (41D7-88E1-DD27D8F457C4) | 550 | 55 | 657 | 657 |
| 20080501T08:30:52Z | 2 (4355-AF90-BFA961E2F60D) | 650 | 33 | 342 | 765 |
| 20080501T08:30:52Z | 4 (4D89-A2C5-C568ABD09BB3) | 1000 | 45 | 234 | 456 |
| 20080501T08:30:52Z | 5 (41D7-88E1-DD27D8F457C4) | 120 | 65 | 123 | 345 |
| 20080501T08:80:52Z | 6 (4341-91E9-B0031F432FC2) | 478 | 78 | 567 | 65 |
| 20080501T08:30:52Z | 7 (4D61-B1DD-F0EB6E9C2E14) | 340 | 23 | 664 | 89 |
| 20080501T08:30:52Z | 5 (41D7-88E1-DD27D8F457C4) | 120 | 56 | 657 | 78 |
| 20080501T08:70:52Z | 3 (4ED6-98FC-241B3BCF2171) | 320 | 45 | 989 | 89 |
| 20080501T08:30:52Z | 1 (462C-B1E7-615199A92463) | 800 | 87 | 786 | 67 |
| 20080501T08:30:52Z | 4 (4D89-A2C5-C568ABD09BB3) | 1000 | 98 | 567 | 56 |

RESOURCE MANAGEMENT FOR SOFTWARE CONTAINERS USING CONTAINER PROFILES

FIELD

The field relates generally to information processing, and more particularly to techniques for managing cloud-based information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems.

SUMMARY

Illustrative embodiments of the present disclosure provide techniques for resource management for software containers using container profiles.

In one embodiment, a method comprises receiving a request to execute an instance of a given software container, determining a set of source code entities of source code of the given software container, and generating a given software container profile for the given software container based at least in part on rankings associated with the set of source code entities of the source code of the given software container. The method also comprises creating a resource management plan for the given software container utilizing one or more machine learning algorithms, the resource management plan comprising a set of resource management metric thresholds determined based at least in part on historical resource utilization data for one or more additional software containers having associated software container profiles exhibiting at least a threshold level of similarity to the given software container profile. The method further comprises executing the instance of the given software container on a software container platform, and managing resource utilization of the executing instance of the given software container based at least in part on the resource management plan for the given software container. The method is performed by at least one processing device comprising a processor coupled to a memory.

These and other illustrative embodiments include, without limitation, methods, apparatus, networks, systems and processor-readable storage media.

BRIEF DESCRIPTION OF THE DRAWINGS

FIG. 5 shows generation of container weights in an illustrative embodiment.

FIG. 9 shows an example of historical resource utilization data for container instances in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

In container platforms, the importance of a software container (e.g., from a resource allocation point of view) may be determined using "technical" factors such as application traffic, redundancy, and availability. Resource management in container platforms, including throttling of resources allocated to or utilized by software container instances, may be handled using quota systems, traffic-based scaling in and out, attributed-based throttling, etc. In effect, all these are technical factors that play a deciding role in how resources (e.g., compute resources, memory resources, storage resources, network resources, etc.) are allocated to different software container instances.

Illustrative embodiments provide techniques for measuring a software container's importance based at least in part on "functional" factors to determine a profile for the software container. The functional factors characterize the functioning or behavior of applications running in the software container. The container profile is used, along with historical resource utilization data for software container instances, to enable a container platform at runtime to dynamically regulate the allocation, de-allocation and throttling of resources by container instances in accordance with the importance of the software containers. Machine learning algorithms may be used for determining the container profiles and generating resource management plans for different software container instances based at least in part on the functional factors. In this way, embodiments provide for intelligent resource management in container platforms.

Figure 1:
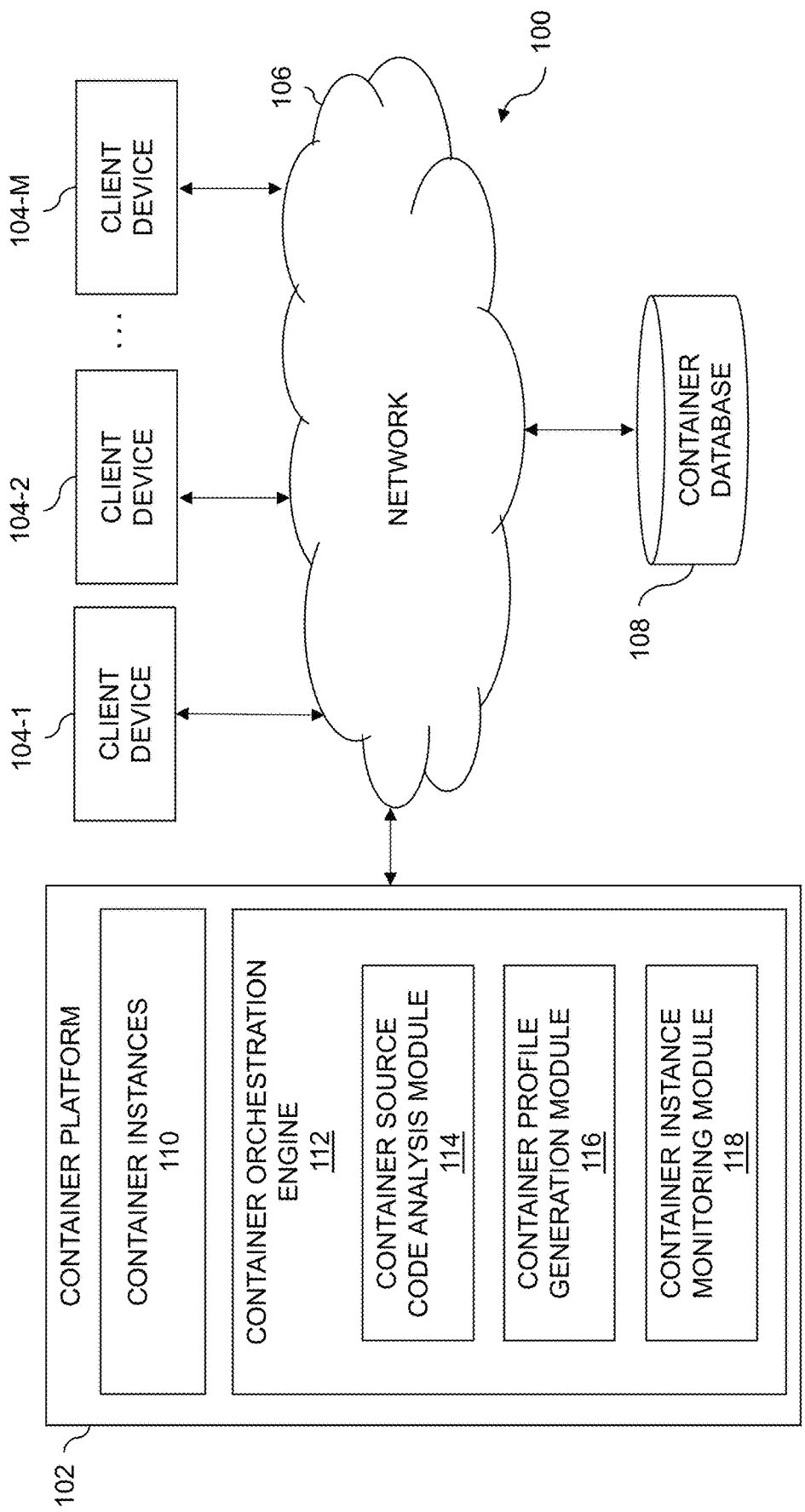
FIG. 1 is a block diagram of an information processing system for resource management for software containers using container profiles in an illustrative embodiment.

FIG. 1 shows an information processing system 100 configured in accordance with an illustrative embodiment. The information processing system 100 is assumed to be built on at least one processing platform and provides functionality for resource management for software containers using container profiles. The software containers, also referred to herein as containers, are assumed to have varying importance to a user, organization or enterprise that requests execution of the containers on a container platform 102 via client devices 104-1, 104-2, . . . 104-M (collectively, client devices 104). A container orchestration engine 112 of the container platform 102 receives requests from the client devices 104 to execute containers, and the container platform 102 runs one or more container instances 110 as requested by the client devices 104. The container platform 102 and client devices 104 are coupled to a network 106. Also coupled to the network 106 is a container database 108, which may store various information relating to the containers and container instances 110 as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. The container instances 110 running on the container platform 102 may be associated with a particular enterprise, with the container profiles being used to manage resource utilization by the container instances 110 based at least in part on the importance of the different container instances 110 to the enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The container database 108, as discussed above, is configured to store and record information relating to containers, such as container profiles, weights associated with different types of containers or portions of source code in different containers, etc. Such information may be used in generating new container profiles used for newly created or requested container types. The container database 108 may also or alternatively store information regarding historical resource utilization by container instances associated with different container types. Such historical resource utilization information or data may be used by the container orchestration engine 112 in machine learning algorithms for determining weights or container profiles for newly created or requested containers, for generating resource management plans for different container profiles, etc.

The container database 108 in some embodiments is implemented using one or more storage systems or devices associated with the container platform 102. In some embodiments, one or more of the storage systems utilized to implement the container database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the container platform 102 and the container orchestration engine 112, as well as to support communication between the container platform 102, the container orchestration engine 112 and other related systems and devices not explicitly shown.

In some embodiments, the client devices 104 may implement host agents that are configured for communication with the container orchestration engine 112. The container orchestration engine 112, as will be described in further detail below, is configured to monitor container instances 110 running on the container platform 102 and to regulate resource utilization (e.g., by throttling resource consumption by a container instance, allocating resources to or de-allocating resources from a container instance, etc.) by such container instances in accordance with or based at least in part on container profiles associated with the container instances 110. The host agents implemented by the client devices 104 may be configured to receive notifications or alerts when particular ones of the container instances 110 are throttled or otherwise have associated resources dynamically managed by the container orchestration engine 112 in accordance with their associated container profiles. In some embodiments, such notifications and alerts for a given one of the container instances 110 may be provided to a given one of the client devices 104 that requested execution of the given container instance 110. In other embodiments, such notifications and alerts may alternatively or further be provided to a system administrator, information technology (IT) personnel or other users that are responsible for managing the container platform 102 or a set of container instances 110 associated with a particular enterprise or other entity.

It should be noted that a "host agent" as this term is generally used herein may comprise an automated entity, such as a software entity running on a processing device. Accordingly, a security agent or host agent need not be a human entity.

Although shown as an element of the container platform 102 in this embodiment, the container orchestration engine 112 in other embodiments can be implemented at least in part externally to the container platform 102, for example, as a stand-alone server, set of servers or other type of system coupled to the network 106. In some embodiments, the container orchestration engine 112 may be implemented at least in part within one or more of the client devices 104.

The container orchestration engine 112 in the FIG. 1 embodiment is assumed to be implemented using at least one processing device. Each such processing device generally comprises at least one processor and an associated memory, and implements one or more functional modules for controlling certain features of the container orchestration engine 112. In the FIG. 1 embodiment, the container orchestration engine 112 comprises a container source code analysis module 114, a container profile generation module 116 and a container instance monitoring module 118.

The container orchestration engine 112 is configured to receive requests to execute container instances 110 from the client devices 104. For a given request to execute an instance of a given software container, the container source code analysis module 114 is configured to determine a set of source code entities of source code of the given software container. The container profile generation module 116 is configured to generate a given software container profile for the given container based at least in part on rankings associated with the set of source code entities of the source code of the given software container. The term "rankings" as used herein is intended to be construed broadly, so as to encompass ordered listings of source code entities (e.g., in order of functional importance to an enterprise system as described herein), numerical weights or rankings assigned to source code entities, etc.

The container instance monitoring module 118 is configured to create a resource management plan for the given software container utilizing one or more machine learning algorithms. The resource management plan comprises a set of resource management metric thresholds determined based at least in part on historical resource utilization data for one or more additional software containers having associated software container profiles similar to the given software container profile. By similar to, it is meant that the software container profiles of the additional software containers exhibit at least a threshold level of similarity to the given software container profile as described in further detail below. The container instance monitoring module 118 is also configured to execute the requested instance of the given software container on the container platform 102, and to manage resource utilization of the executing instance of the given software container based at least in part on the resource management plan for the given software container.

It is to be appreciated that the particular arrangement of the container platform 102, the container orchestration engine 112, the container source code analysis module 114, the container profile generation module 116 and the container instance monitoring module 118 illustrated in the FIG. 1 embodiment is presented by way of example only, and alternative arrangements can be used in other embodiments. As discussed above, for example, the container platform 102, the container orchestration engine 112, the container source code analysis module 114, the container profile generation module 116 and the container instance monitoring module 118 may in some embodiments be implemented internal to one or more of the client devices 104. As another example, the functionality associated with the container source code analysis module 114, the container profile generation module 116 and the container instance monitoring module 118 may be combined into one module, or separated across more than three modules with the multiple modules possibly being implemented with multiple distinct processors or processing devices.

At least portions of the container source code analysis module 114, the container profile generation module 116 and the container instance monitoring module 118 may be implemented at least in part in the form of software that is stored in memory and executed by a processor.

It is to be understood that the particular set of elements shown in FIG. 1 for management of software containers using container profiles is presented by way of illustrative example only, and in other embodiments additional or alternative elements may be used. Thus, another embodiment may include additional or alternative systems, devices and other network entities, as well as different arrangements of modules and other components.

By way of example, in other embodiments, the container orchestration engine 112 may be implemented external to container platform 102, such that the container platform 102 can be eliminated. For example, container instances 110 may run on respective ones of the client devices 104, with the container orchestration engine 112 managing such container instances running on the client devices 104 rather than on a separate container platform 102.

The container platform 102, including the container orchestration engine 112, and other portions of the system 100 may be part of cloud infrastructure as will be described in further detail below.

The container orchestration engine 112 and other components of the container platform 102 and information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The client devices 104 and container platform 102 or components thereof (e.g., the container orchestration engine 112, container source code analysis module 114, container profile generation module 116 and container instance monitoring module 118) may be implemented on respective distinct processing platforms, although numerous other arrangements are possible. For example, in some embodiments at least portions of the container orchestration engine 112 and one or more of the client devices 104 are implemented on the same processing platform. A given client device (e.g., 104-1) can therefore be implemented at least in part within at least one processing platform that implements at least a portion of the container orchestration engine 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the container platform 102, client devices 104 and container database 108, or portions or components thereof, to reside in different data centers. Numerous other distributed implementations are possible. The container platform 102, or portions thereof such as the container orchestration engine 112 can also be implemented in a distributed manner across multiple data centers.

Additional examples of processing platforms utilized to implement the container orchestration engine 112 and other portions of the system 100 in illustrative embodiments will be described in more detail below in conjunction with FIGS. 12 and 13.

It is to be appreciated that these and other features of illustrative embodiments are presented by way of example only, and should not be construed as limiting in any way.

Figure 2:
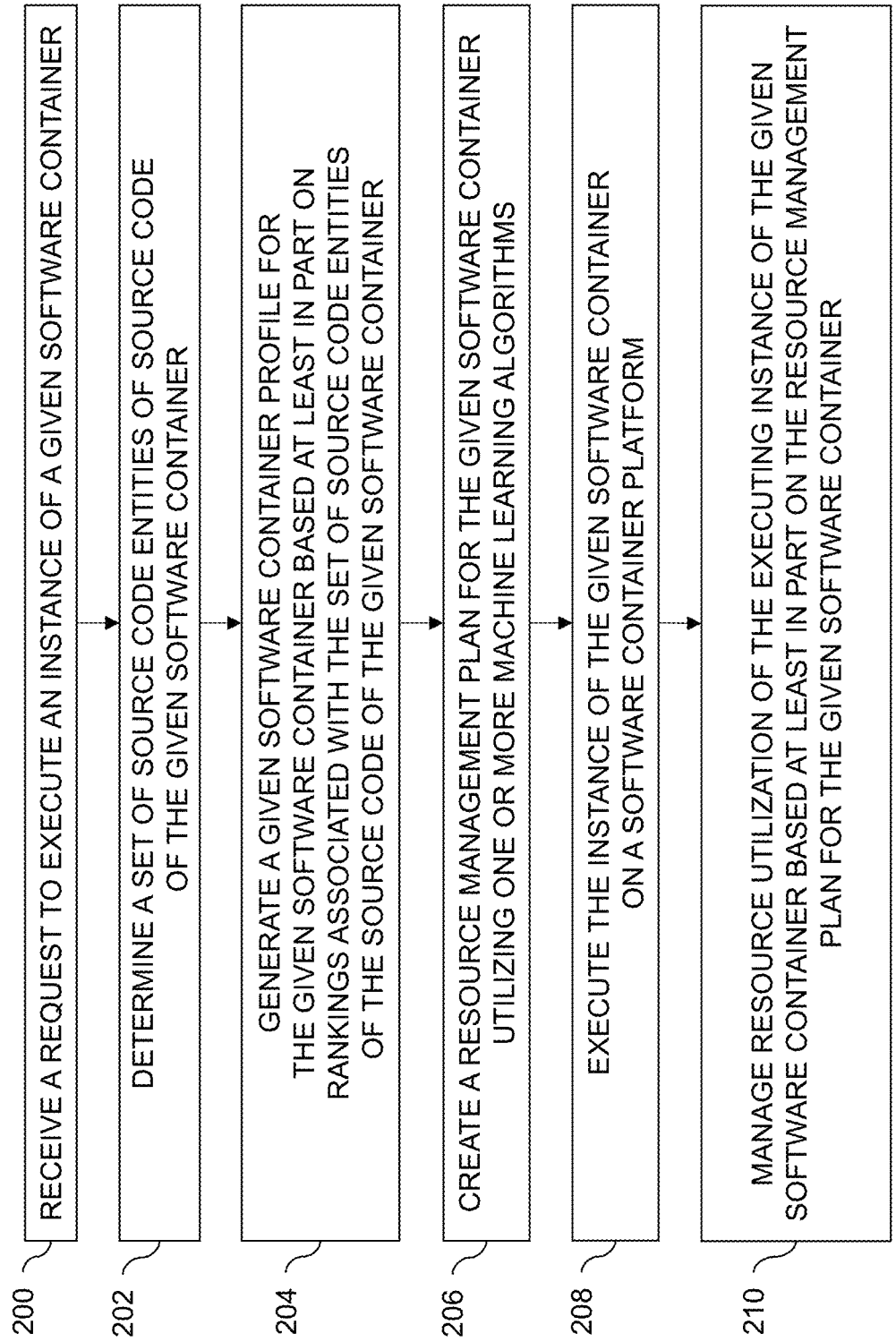
FIG. 2 is a flow diagram of an exemplary process for resource management for software containers using container profiles in an illustrative embodiment.

An exemplary process for management of software containers using container profiles will now be described in more detail with reference to the flow diagram of FIG. 2. It is to be understood that this particular process is only an example, and that additional or alternative processes for management of software containers using container profiles may be used in other embodiments.

In this embodiment, the process includes steps 200 through 210. These steps are assumed to be performed by the container orchestration engine 112 utilizing the container source code analysis module 114, container profile generation module 116 and container instance monitoring module 118. The process begins with step 200, receiving a request to execute an instance of a given software container. The request received in step 200 may comprise a container image for the given software container, or source code for one or more applications that is to be packaged into a container image for the given software container. Step 202 includes determining a set of source code entities of source code of the given software container. The set of source code entities comprise at least one of software classes, software methods, software functions, software modules, etc.

In step 204, a given software container profile for the given software container is generated based at least in part on rankings associated with the set of source code entities of the source code of the given software container. A given one of the rankings associated with a given one of the source code entities characterizes functional importance to an enterprise system. Functional importance to the enterprise system may be determined based at least in part on usage of the given source code entity and connectedness of the given source code entity. Usage of the given source code entity may be determined based at least in part by analyzing basis path hits at runtime of the given source code entity by instances of software containers comprising the given source code entity. Connectedness of the given source code entity may be determined based at least in part by identifying a number of edges connecting a node representing the given source code entity to one or more other nodes in a source code entities graph, the source code entities graph comprising nodes representing a plurality of source code entities and edges connecting the nodes representing linkages between the plurality of source code entities in a plurality of software containers.

The process continues with step 206, creating a resource management plan for the given software container utilizing one or more machine learning algorithms, the resource management plan comprising a set of resource management metric thresholds determined based at least in part on historical resource utilization data for one or more additional software containers having associated software container profiles similar to the given software container profile. The software container profiles associated with the one or more additional software containers have respective software container profile weight values within a designated threshold of a given software container profile weight of the given software container profile. The distances between software container profile weights indicate relative functional importance between applications that run in the different software containers. In other words, two software container profiles with the same container profile weight are assumed to run applications having the same or similar functional importance to an enterprise system. Having the same or similar functional importance does not require that applications have the same functionality.

The designated threshold may comprise k, and the step 206 may comprise utilizing a k nearest neighbor (KNN) machine learning algorithm to identify k software container profiles from a repository of software container profiles, the k software container profiles comprising those software container profiles in the software container profile repository which comprise software container profile weights closest to the given software container profile weight. The set of resource management metric thresholds of the resource management plan for the given software container comprise a central processing unit (CPU) resource utilization limit calculated based on historical CPU resource utilization by instances of software containers associated with the k software container profiles, a memory resource utilization limit calculated based on historical memory resource utilization by the instances of the software containers associated with the k software container profiles, and a storage space utilization limit calculated based on historical storage space utilization by the instances of the software containers associated with the k software container profiles.

In step 208, the instance of the given software container request in step 200 is executed on a software container platform. Resource utilization of the executing instance of the given software container is managed in step 210 based at least in part on the resource management plan for the given software container. Step 210 may comprise monitoring resource utilization by the executing instance of the given software container, and dynamically altering resource utilization by the executing instance of the given software container responsive to the monitored resource utilization being outside one or more of the set of resource management metric thresholds. Dynamically altering resource utilization by the executing instance of the given software container comprises allocating additional resources of the container platform to the executing instance of the given software container, de-allocating resources of the container platform from the executing instance of the given software container, throttling resource usage by the executing instance of the given software container, etc.

Figure 3:
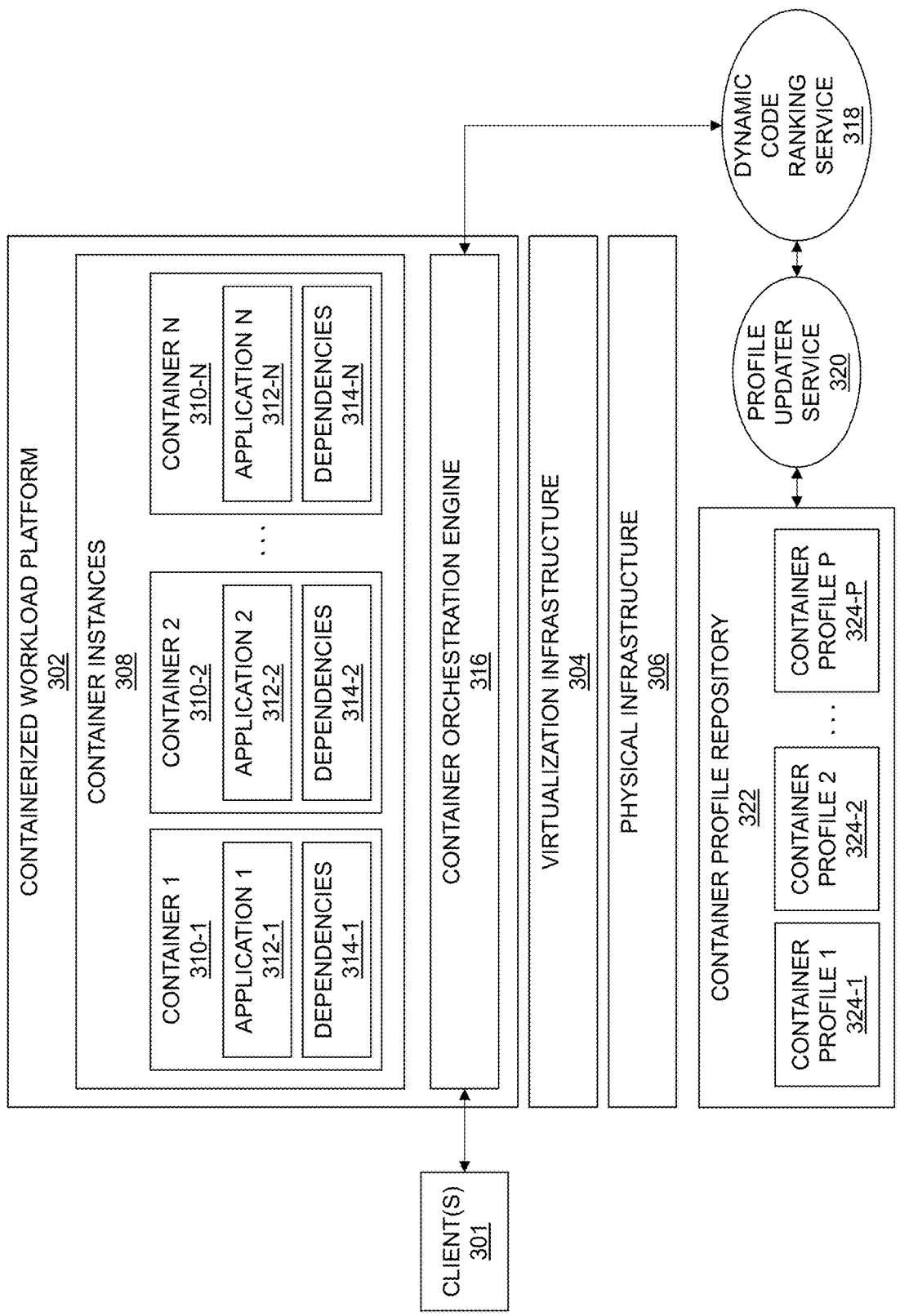
FIG. 3 shows a containerized workload platform configured for resource management for software containers using container profiles in an illustrative embodiment.

FIG. 3 shows a containerized workload platform 302 running on virtualization infrastructure 304 (e.g., an operating system) that runs on physical infrastructure 306 (e.g., hardware). The containerized workload platform 302 runs a set of container instances 308, including containers 310-1, 310-2, . . . 310-N (collectively, containers 310). Each of the containers 310 is assumed to comprise a set of container images that provide the code for at least one application 312 and its dependencies 314. For example, the container 310-1 may comprise an application image 312-1 and a dependencies image 314-1, with the dependencies image 314-1 including the libraries, binaries and other dependencies required to run the at least one application 312-1.

The containerized workload platform 302 includes a container orchestration engine 316, which is configured to communicate with a dynamic code ranking service 318, a profile updater service 320 and a container profile registry 322 comprising a set of container profiles 324-1, 324-2, . . . 324-P (collectively, container profiles 324). Clients 301 are configured to communicate with the containerized workload platform 302 via the container orchestration engine 316 to request execution of the container instances 310.

The container orchestration engine 316 is configured to determine container profiles for containers based at least in part on the importance of code contained within a container from a functional perspective (e.g., importance to business or other functions of an enterprise). The container orchestration engine 316 computes a profile weight, and builds a container profile for each container that is saved to the container profile registry 322 as one of the container profiles 324.

Using container profile metrics and historical container resource utilization data, the container orchestration engine 316 is configured at runtime of the container instances 310 to predict an optimized resource management plan for each of the container instances 310. Predicting the optimized resource management plan, in some embodiments, utilizes one or more machine learning algorithms such as a KNN machine learning algorithm. The container orchestration engine 316 at runtime dynamically monitors and manages resource utilization (e.g., resource allocation, de-allocation, throttling, etc.) based at least in part on the predicted optimized resource management plan. The optimized resource management plan is determined using the container profiles, historical container resource utilization data, and machine learning algorithms. Using the optimized resource management plans, the container orchestration engine 316 is able to ensure that ones of the container instances 310 with higher profiles (e.g., corresponding to containers running applications that are more important to an enterprise from a functional perspective) have more or better resources available to them than other ones of the container instances 310 with lower container profiles (e.g., corresponding to containers running applications that are less important to the enterprise from the functional perspective).

Figure 4:
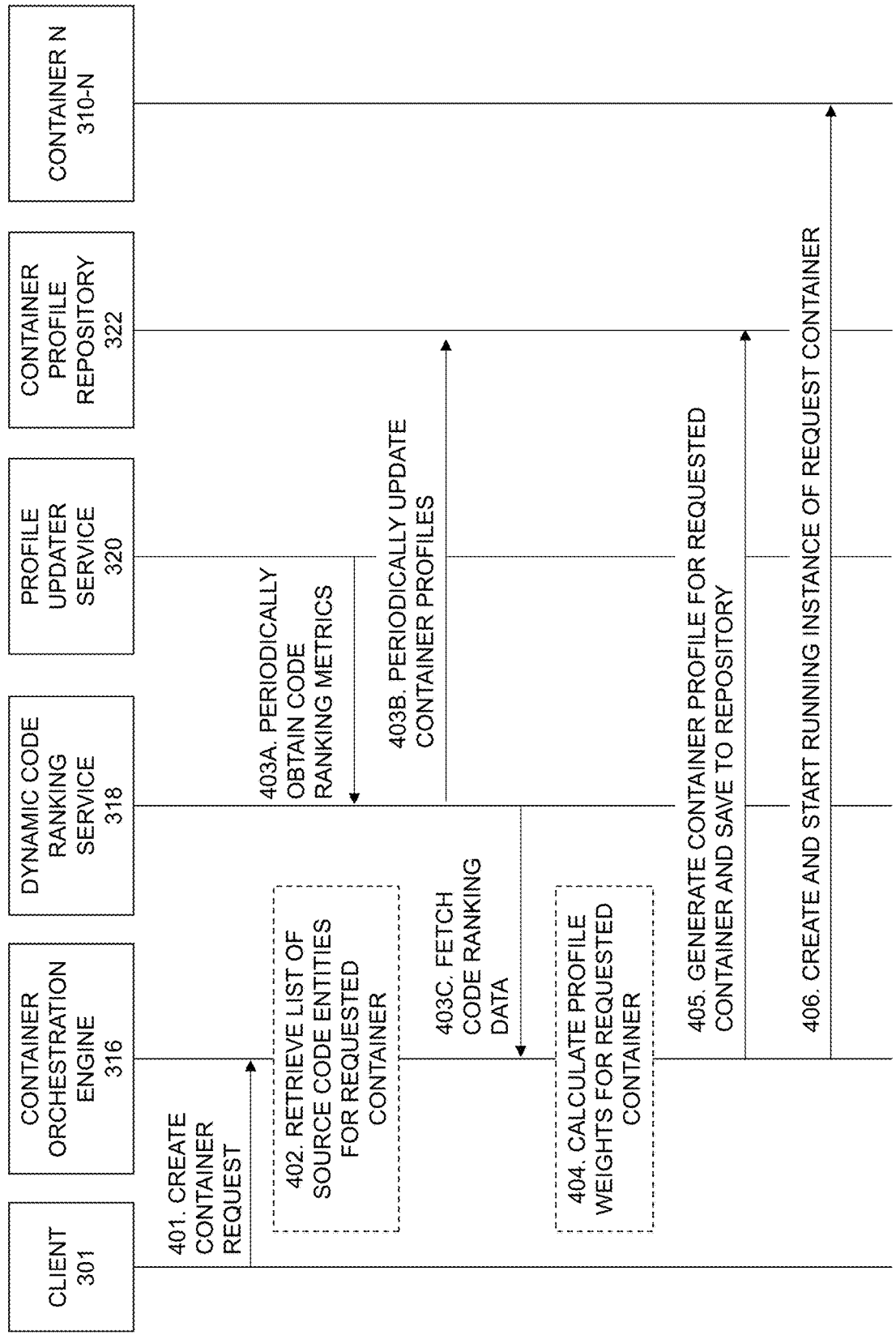
FIG. 4 shows a process flow for generating a container profile in the FIG. 3 containerized workload platform in an illustrative embodiment.

FIG. 4 shows a process flow for generating container profiles utilizing the containerized workload platform 302 of FIG. 3. In step 401, the client 301 creates a container request (e.g., to execute or run an instances of a container 310-N on the containerized workload platform 302) and provides the container request to the container orchestration engine 316. The container orchestration engine 316 in step 402 retrieves a list of all source code entities (e.g., classes, functions, methods, etc.) that are used in the container 310-N that is the subject of the container request received in step 401. It should be noted that the step 401 container request may specify a particular container image, or may include source code that is to be containerized.

The dynamic code ranking service 318 provides a dynamic ranking of source code entities based at least in part on usage and importance of the source code entities to an enterprise. The profile updater service 320 is configured to periodically fetch the latest code ranking metrics from dynamic code ranking service 318 in step 403A. The profile updater service 320, with the dynamic code ranking service 318, is configured to periodically update in step 403B the container profiles 324 stored in the container profile repository 322 for the container instances 310 executing on the containerized workload platform 302. Each of the container profiles 324 in container profile repository 322 in some embodiments is assumed to include a list of source code entities contained in a given container, ranking and categorization details for each of the source code entities, and profile weights calculated for the given container.

Steps 403A and 403B, as noted above, may be performed periodically. In some embodiments, "periodically" refers to performing such steps at regular or defined intervals (e.g., time-based such as once a day or once a week, event-based such as whenever a new container instance is started or when an existing container instance is stopped, etc.). It should be appreciated, however, that "periodically" in this context does not require that steps 403A and 403B are performed at such regular or defined intervals. For example, in other embodiments steps 403A and 403B may be performed responsive to user requests that do not necessarily occur at regular or defined intervals.

In step 403C, the container orchestration engine 316 fetches code ranking data from the dynamic code ranking service 318. Step 403C may include fetching code ranking data for all source code entities inside the container code of the container requested in step 401. The container orchestration engine 316 utilizes the code ranking data to calculate profile weights in step 404.

In step 405, the container orchestration engine 316 generates a container profile for the requested container, and saves the generated container profile to the container profile repository 322. The container orchestration engine 316 then, in step 406, creates a container instance 310-N for the requested container, and starts running the container instance 310-N on the containerized workload platform 302.

Container profiles 324 in the container profile repository 322 may have associated container profile weights. When a request for container provisioning is received by the container orchestration engine 316 (e.g., step 401 in FIG. 4), the container orchestration engine 316 performs various actions to generate a container profile including a container profile weight for the requested container. Initially, the container orchestration engine 316 can scan a code base (e.g., of source code in the requested container) to extract a list of all source code entities (e.g., classes, functions, methods, modules, etc.) contained therein. In the description below, it will be assumed that the source code entities are classes.

The container orchestration engine 316 calls the dynamic code ranking service 318 to obtain "ranks" for each of the classes in the requested container. The class rank denotes the importance of that class from a functional point of view. The dynamic code ranking service 318 is configured to categorize application source code entities, such as classes, and builds a ranking hierarchy where the ranks are based at least in part on the "usage" and "connectedness" of the source code entities over a duration of application execution. The dynamic code ranking service 318 identifies which parts of the source code are used more frequently (e.g., by analyzing basis path hits at runtime) to generate usage scores for each of the source code entities. The dynamic code ranking service 318 may generate a source code entities graph for analyzing and determining connectedness scores for each of the source code entities. In some embodiments, the dynamic code ranking service 318 does so by determining, for the given source code entity, how may graph edges relate the given source code entity to other source code entities in a network of source code entities in the source code entities graph. The more the given source code entity is referred to (e.g., the more "edges" it has in the source code entities graph), the higher its connectedness score. The usage and connectedness scores for the given source code entity may be combined (e.g., by averaging, using a weighted average that assigns different weights to usage and connectedness scores, etc.) to calculate a final or overall functional importance ranking score for the given source code entity.

FIG. 5 shows an example 501 of a code ranking list for various source code classes. In this example, a set of source code classes are assigned ranks 1-24, where each rank is associated with just one source code class. It should be appreciated, however, that in other embodiments the code ranking list 501 may assign multiple source code classes a same rank (e.g., there may be two or more source code classes with rank 1, two or more source code classes with rank 2, etc.). Weight coefficients are assigned to groups of the source code classes as illustrated in table 503. As indicated in table 503, the top 25% of the source code classes are assigned a weight coefficient X, the top 26%-50% of the source code classes are assigned a weight coefficient Y, and the bottom 50% of the source code classes are assigned a weight coefficient Z. It should be appreciated that the number of weight coefficients used as well as the delineation between the weight coefficients may vary as desired. In some embodiments, there may be more than three weight coefficients and the percentiles associated with the weight coefficients may vary. For example, ten weight coefficients may be used, with a first weight coefficient corresponding to the top 10% of source code classes, a second weight coefficient corresponding to the top 11%-20% of source code classes, a third weight coefficient corresponding to the top 21%-30% of source code classes, etc. Various other examples are possible.

As illustrated in table 505 of FIG. 5, the container profile weight for a given container may be calculated as an arithmetic mean of all values. A is used to denote the number of source code entities with weight coefficient X, B is used to denote the number of source code entities with weight coefficient Y, and C is used to denote the number of source code entities with weight coefficient Z. The final or overall weight score for a given container may thus be computed as $$\frac{(A*X)+(B*Y)+(C*Z)}{A+B+C}.$$

Table 507 of FIG. 5 shows examples of container profile weight calculations for two containers (e.g., container 1 and container 2) with the assumption that the weight coefficients are X=10, Y=5 and Z=2. Once again, it should be noted that the particular values assigned to the weight coefficients may vary as desired. Container 1 is assumed to include 34 source code entities with X weight, 55 source code entities with Y weight, and 109 source code entities with Z weight, for an overall final weight score of 833. Container 2 is assumed to include 5 source code entities with X weight, 200 source code entities with Y weight, and 150 source code entities with Z weight, for an overall final weight score of 1350.

It should be noted that the final or overall weight scores are used as a representation of functional importance of different containers, and do not necessarily indicate similarity between the functioning of different containers. For example, two containers may have a same or similar weight, indicating that their associated functional importance to an enterprise is the same or similar. The two containers, however, may have entirely different functionality (e.g., they may be used to run two entirely different applications, such as one for security monitoring and the other for customer support).

Figure 6:
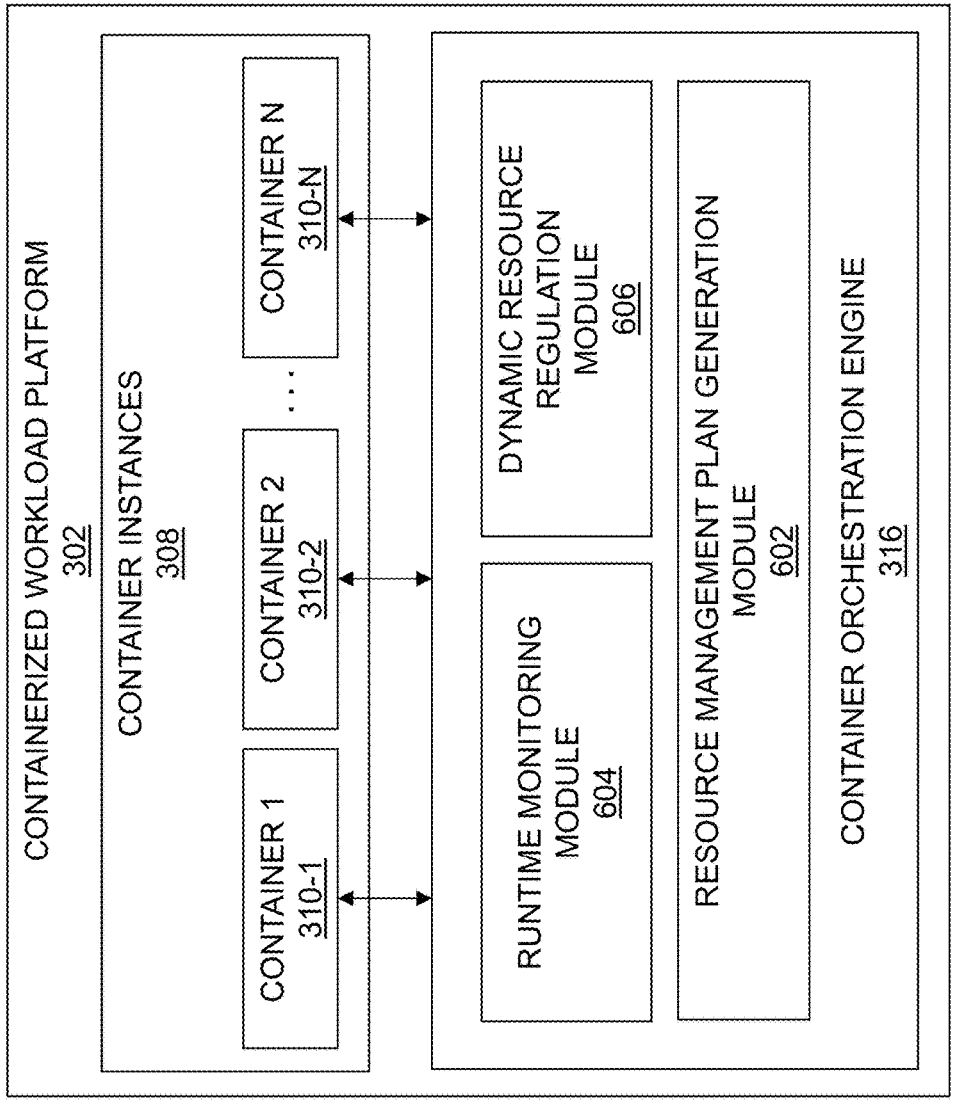
FIG. 6 shows a detailed view of the container orchestration engine of the FIG. 3 containerized workload platform in an illustrative embodiment.

FIG. 6 shows a detailed view of the container orchestration engine 316, which includes a resource management plan generation module 602, a runtime monitoring module 604 and a dynamic resource regulation module 606. The resource management plan generation module 602 is configured to generate a predicted or optimized resource plan for each of the containers 310 running on the containerized workload platform 302, as will be described in further detail below with respect to FIG. 7. The runtime monitoring module 604 is configured to monitor resource consumption by the containers 310 running on the containerized workload platform 302. The dynamic resource regulation module 606 is configured to dynamically and intelligently regulate resource consumption by the containers 310 (e.g., by allocating or de-allocating resources to respective ones of the containers 310, by throttling resource consumption by the containers 310, etc.) based at least in part on the predicted resource plan provided by the resource management plan generation module 602.

The container orchestration engine 316 is configured to augment the containerized workload platform 302 at runtime with optimized resource management plans. At any point in time, there may be many containers 310 running in the containerized workload platform 302, where each of the containers 310 may initially be allocated certain amounts of resources (e.g., memory, storage space, compute or CPU power or cycles, etc.). The initial allocation of resources may be based at least in part on default or existing manual configurations.

Figure 7:
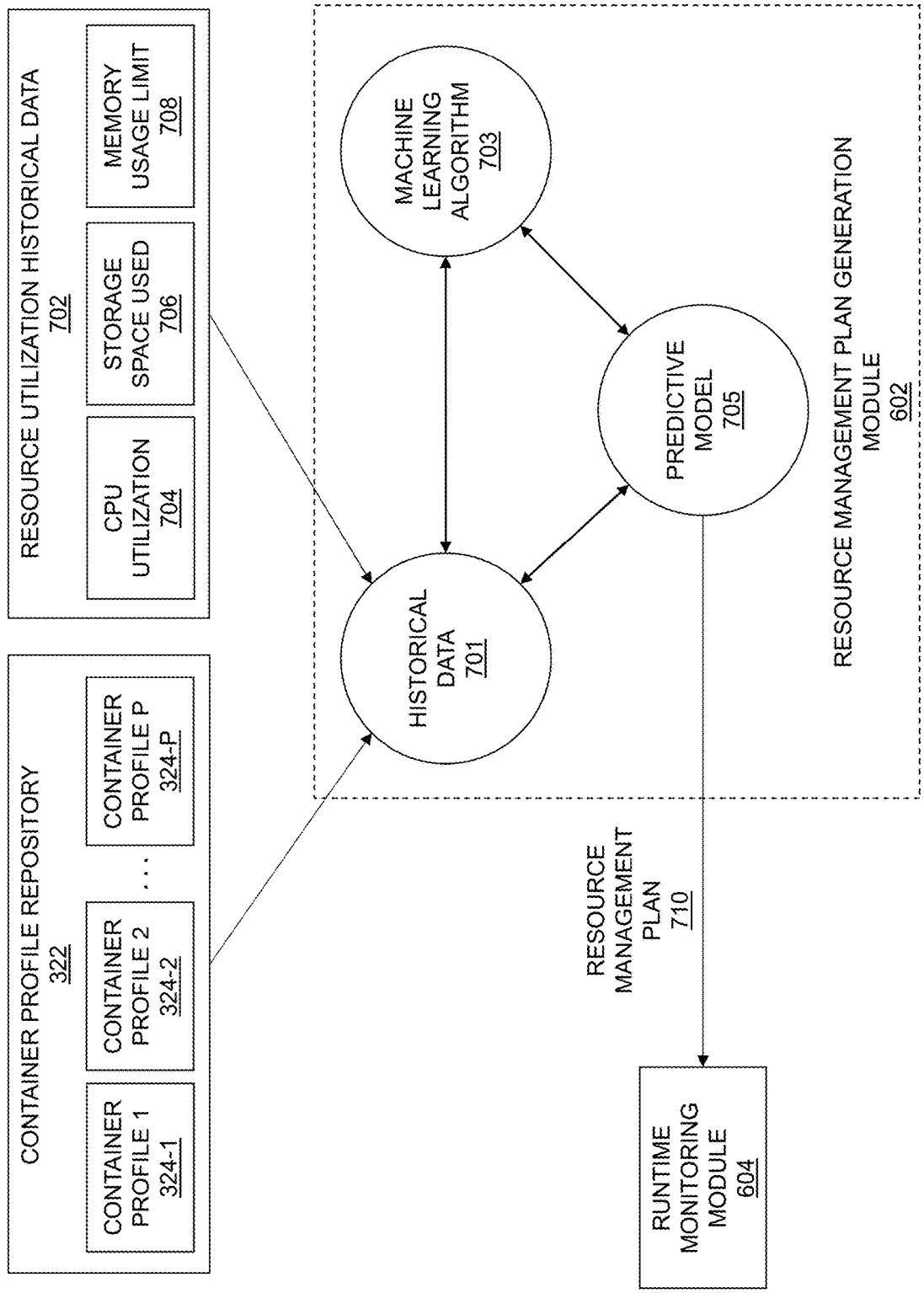
FIG. 7 shows generation of a resource management plan using the FIG. 5 container orchestration engine in an illustrative embodiment.

The container orchestration engine 316, at runtime, is configured to request and generate optimized resource plans for each of the running containers 310 using the resource management plan generation module 602. The resource management plan generation module 602, as illustrated in FIG. 7, may implement a predictor system that utilizes historical data 701, one or more machine learning algorithms 703, and a predictive model 705 to generate optimized resource management plans.

To generate an optimized resource management plan for a given container, the resource management plan generation module 602 obtains historical data 701 for "similar" containers (e.g., containers with associated container profiles 324 in the container profile repository 322 with similar profile weights). The determination of "similar" containers may be based at least in part on or utilize machine learning algorithms 703 as well be described in further detail below. The historical data 701 may thus include resource utilization historical data 702, including CPU utilization data 704 (e.g., a maximum CPU utilization over some designated time frame, a median or average CPU utilization over the designated time frame, etc.), storage space used 706 (e.g., a maximum storage space used over the designated time frame, a median or average storage space used over the designated time frame, etc.) and memory usage limits 708 (e.g., a maximum memory usage over the designated time frame, a median or average of memory usage over the designated time frame, etc.). Such information may be provided by various container monitoring tools. In some cases, the container monitoring tools may store such information in a repository, data store or other database (e.g., container database 108, which may also implement container profile repository 322). The historical data 701 may also include container profiles 324, including container profile weights, for similar containers.

The resource management plan generation module 602 utilizes one or more machine learning algorithms 703 to determine similar containers and for suggesting an optimized resource allocation plan. In some embodiments, KNN machine learning algorithms are utilized to identify similar containers. The predictive model 705 then generates and provides a resource management plan 710 for the given container to the runtime monitoring module 604. The runtime monitoring module 604 utilizes the resource management plan 710 for the given container to monitor running instances of the given container on the containerized workload platform 702. The runtime monitoring module 604, responsive to detecting certain designated conditions regarding resource utilization by the running instance of the given container, will communicate with the dynamic resource regulation module 606 to modify resource utilization by the running instance of the given container. This may include allocating additional resources to the running instance of the given container, de-allocating resources from the running instance of the given container, throttling resource usage by the running instance of the given container, etc. The designated conditions may be determining that resource usage by the running instance of the given container is outside limits identified in the resource management plan 710.

Figure 8:
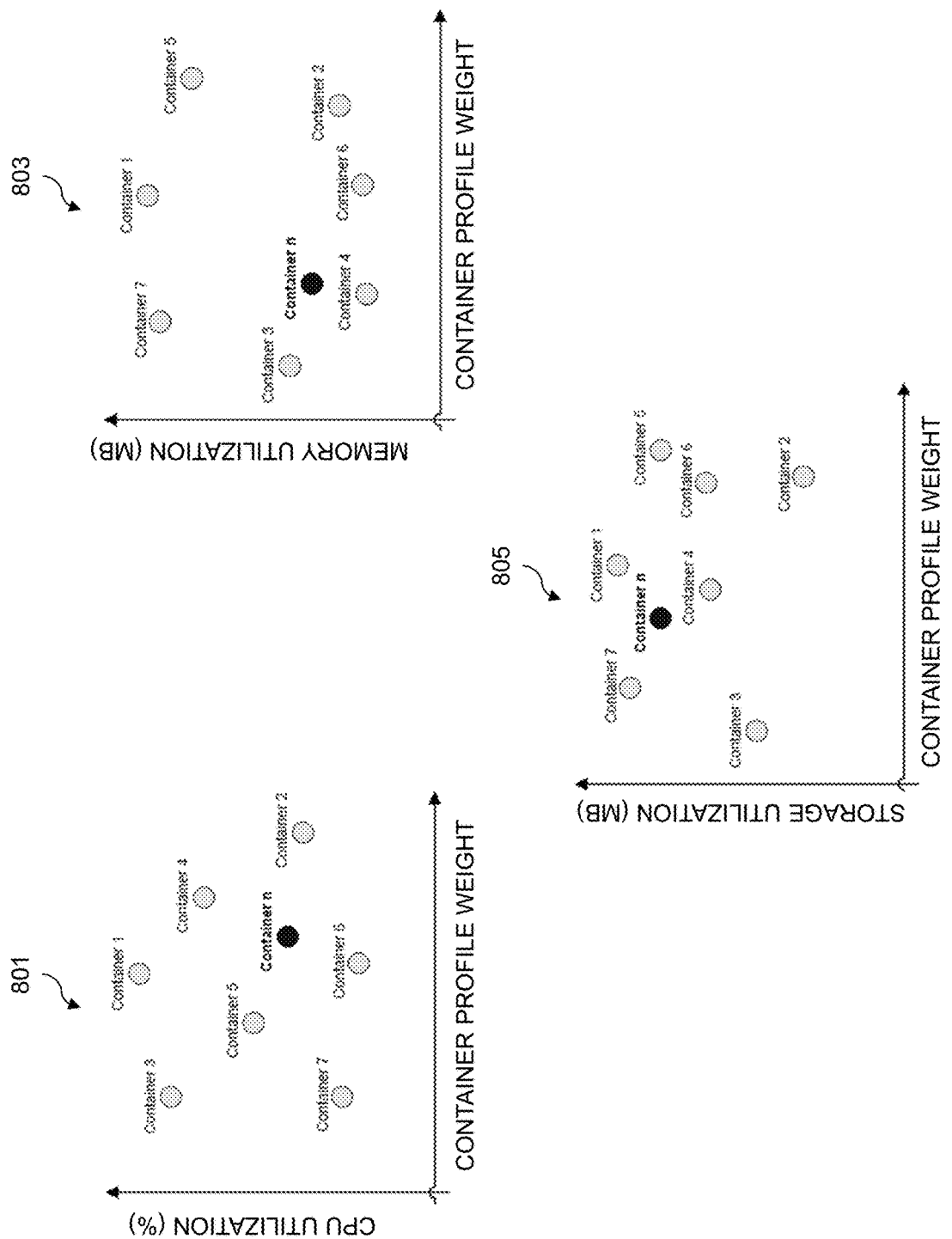
FIG. 8 shows plots of container weights for resource utilization data utilizing a machine learning algorithm in an illustrative embodiment.

FIG. 8 shows plots of KNN regressor models using container profile weights. Plot 801 shows a KNN regressor model that predicts CPU utilization (as a percentage utilization) for a given container based at least in part on its k nearest neighbors, plot 803 shows a KNN regressor model that predicts memory utilization (in megabytes (MB)) for the given container based at least in part on its k nearest neighbors, and plot 805 shows a KNN regressor model that predicts storage utilization (in MB) for the given container based at least in part on its k nearest neighbors. The CPU utilization, memory utilization and storage utilization may be the "maximum" utilization values for such different resources as predicted for each running container instance. In the plots 801, 803 and 805, "container n" is a newly created container for which the model is doing the prediction. The model utilizes the KNN algorithm to find the nearest containers, and then average or otherwise combine such container data points to predict the value for container n. In the FIG. 8 example, k=5. For greater accuracy, the value of k may be increased to cover a larger comparison area. The value of k may also be reduced if desired (e.g., such as where the computing resources available for prediction are constrained).

FIG. 9 shows historical resource utilization data 901 collected over a period of time. The historical resource utilization data 901 may be used for training and validating samples of KNN machine learning algorithms used by the resource management plan generation module 602.

As described above, machine learning algorithms 703 may be used as part of a predictor system implemented by the resource management plan generation module 602 to predict optimized resource plans based at least in part on historical resource utilization data. In some embodiments, as described above, KNN is used as the machine learning algorithm. In other embodiments, however, various other types of machine learning algorithms may be used. Provided below is a comparison of use of KNN and linear regression (LR) machine learning algorithms. Regression approaches such as LR perform well when data variance is small, but as the variance range increases the model accuracy declines drastically with large residual errors. Model accuracy may be measured using root mean square error (RMSE) and R2. KNN provides better model accuracy than LR, particularly in cases with larger data variance. This is because KNN does not rely on linear regression of data but rather tries to find the nearest objects using some distance function, and then uses the average of the values. Therefore, KNN should give a realistic prediction measure even in new scenarios.

Figure 10:
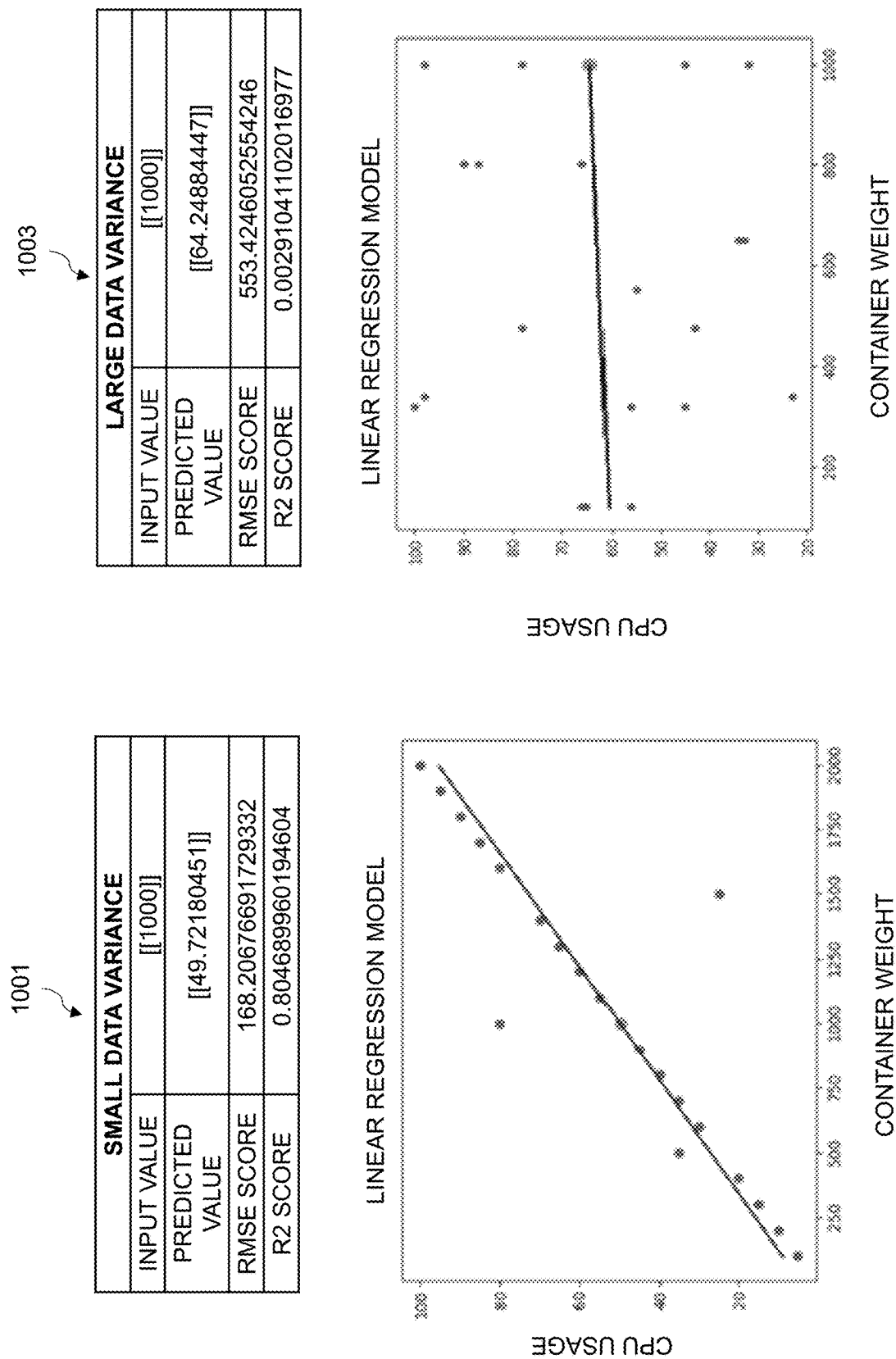
FIG. 10 shows determination of a resource management plan utilizing a linear regression machine learning algorithm with small and large data variance in an illustrative embodiment.
Figure 11:
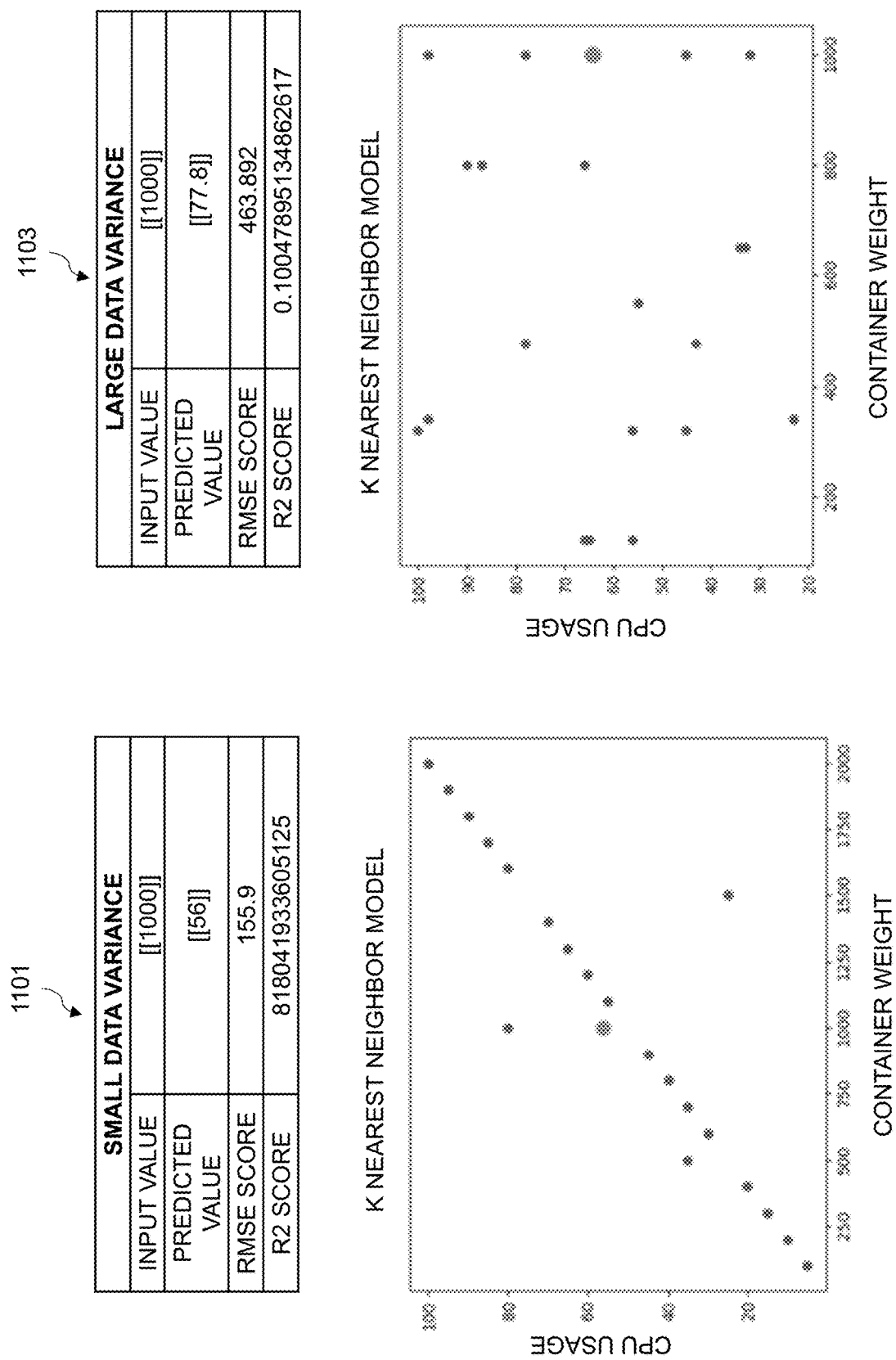
FIG. 11 shows determination of a resource management plan utilizing a k nearest neighbor machine learning algorithm with small and large data variance in an illustrative embodiment.

FIG. 10 shows determination of a resource management plan utilizing a LR machine learning algorithm with small and large data variance. With small data variance as illustrated in plot 1001, acceptable RMSE and R2 scores are achieved. With large data variance as illustrated in plot 1003, however, the RMSE score is significantly higher and the R2 score is significantly lower. FIG. 11 shows determination of a resource management plan utilizing a KNN machine learning algorithm with small and large data variance. With small data variance as illustrated in plot 1101, acceptable RMSE and R2 scores are achieved (e.g., similar or better than that achieved with LR). With large data variance as illustrated in plot 1103, RMSE and R2 scores are improved relative to the use of LR. Thus, some embodiments select KNN as the machine learning algorithm to use for generating optimized resource management plans for containers. In other embodiments, however, such as where there is small data variance, LR may be selected as the machine learning algorithm to achieve good results. The selection amongst different available machine learning algorithms (including but not limited to LR and KNN) may be based at least in part on the available computing resources, available historical data for training, etc.

Illustrative embodiments provide techniques for determining software container weights based at least in part on the functional importance of software containers to an enterprise. The functional importance is based at least in part on the usage and importance of software code contained within the software containers. Using code rankings and historical resource utilization data, embodiments enable intelligent prediction of optimized resource management plans for software containers using machine learning algorithms (e.g., KNN). Advantageously, the optimized resource management plans allow a container platform at runtime to intelligently and dynamically regulate allocation, de-allocation and throttling of resources consumption by software containers in accordance with the functional importance of such software containers to the enterprise.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for resource management for software containers using container profiles will now be described in greater detail with reference to FIGS. 12 and 13. Although described in the context of system 100, these platforms may also be used to implement at least portions of other information processing systems in other embodiments.

Figure 12:
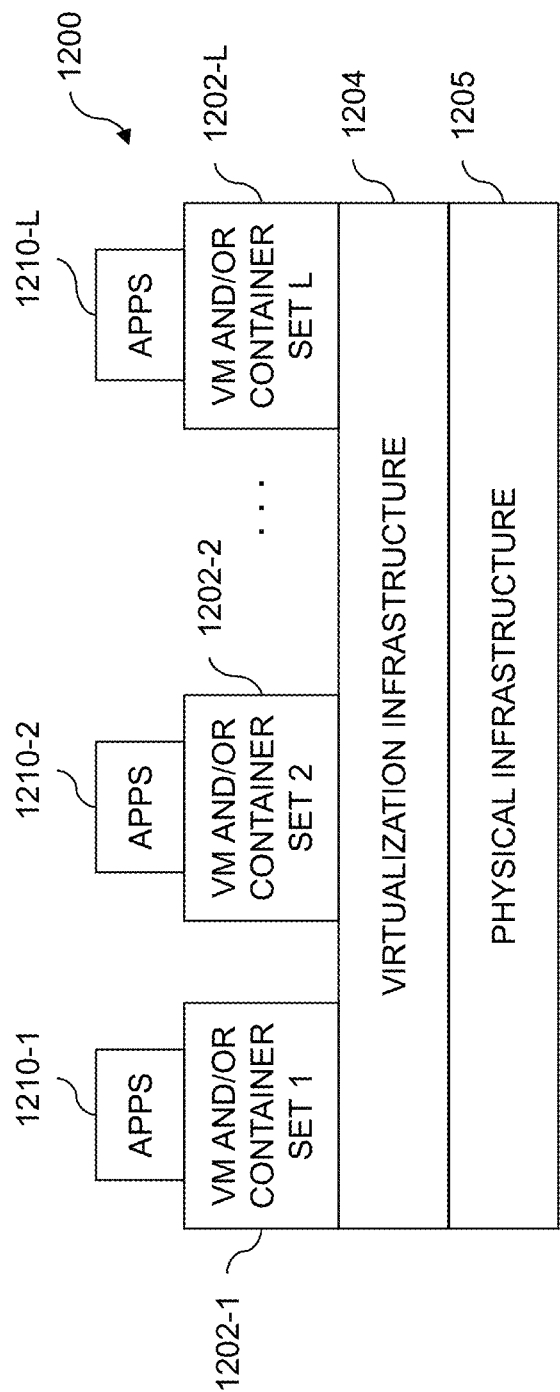
FIGS. 12 and 13 show examples of processing platforms that may be utilized to implement at least a portion of an information processing system in illustrative embodiments.
Figure 13:
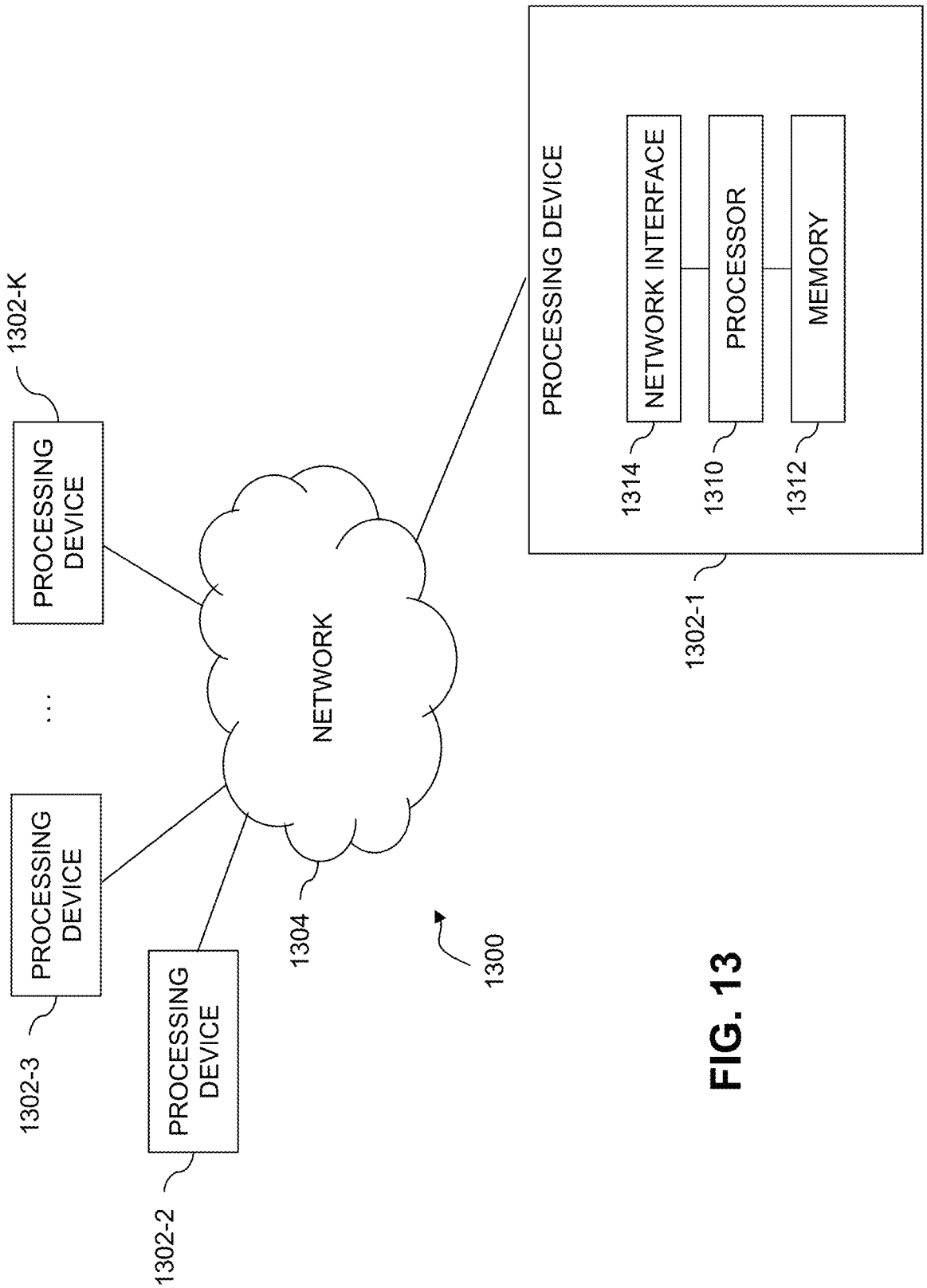

FIG. 12 shows an example processing platform comprising cloud infrastructure 1200. The cloud infrastructure 1200 comprises a combination of physical and virtual processing resources that may be utilized to implement at least a portion of the information processing system 100 in FIG. 1. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for resource management for software containers using container profiles as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, container platforms, machine learning algorithms, container weightings, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising steps of:
   receiving a request to execute an instance of a given software container;
   determining a set of source code entities of source code of the given software container;

generating a given software container profile for the given software container based at least in part on rankings associated with the set of source code entities of the source code of the given software container;

identifying, utilizing one or more machine learning algorithms, one or more additional software containers having associated software container profiles exhibiting at least a threshold level of similarity to the given software container profile;

determining, based at least in part on historical resource utilization data for the identified one or more additional software containers, a set of resource management metric thresholds;

creating a resource management plan for the given software container, the resource management plan comprising the determined set of resource management metric thresholds;

executing the instance of the given software container on a software container platform; and managing resource utilization of the executing instance of the given software container based at least in part on the resource management plan for the given software container;

wherein the method is performed by at least one processing device comprising a processor coupled to a memory.

2. The method of claim 1 wherein the request to execute the instance of the given software container comprises a container image for the given software container.

3. The method of claim 1 wherein the request to execute the instance of the given software container comprises source code for one or more applications to be packaged into a container image for the given software container.

4. The method of claim 1 wherein the set of source code entities comprise at least one of software classes, software methods and software functions.

5. The method of claim 1, wherein a given one of the rankings associated with a given one of the source code entities characterizes functional importance to an enterprise system.

6. The method of claim 5 wherein functional importance to the enterprise system is determined based at least in part on at least one of usage of the given source code entity and connectedness of the given source code entity.

7. The method of claim 6 wherein the usage of the given source code entity is determined based at least in part by analyzing basis path hits at runtime of the given source code entity by instances of software containers comprising the given source code entity.

8. The method of claim 6 wherein the connectedness of the given source code entity is determined based at least in part by identifying a number of edges connecting a node representing the given source code entity to one or more other nodes in a source code entities graph, the source code entities graph comprising nodes representing a plurality of source code entities and edges connecting the nodes representing linkages between the plurality of source code entities in a plurality of software containers.

9. The method of claim 1 wherein the software container profiles associated with the identified one or more additional software containers have respective software container profile weight values within a designated threshold of a given software container profile weight of the given software container profile.

10. The method of claim 9 wherein the designated threshold comprises k and identifying the one or more additional software containers having associated software container profiles exhibiting at least the threshold level of similarity to the given software container profile comprises utilizing a k nearest neighbor machine learning algorithm to identify k software container profiles from a repository of software container profiles, the k software container profiles comprising those software container profiles in the software container profile repository which comprise software container profile weights closest to the given software container profile weight.

11. The method of claim 10 wherein the determined set of resource management metric thresholds comprise at least one of:

a central processing unit (CPU) resource utilization limit calculated based on historical CPU resource utilization by instances of software containers associated with the k software container profiles;

a memory resource utilization limit calculated based on historical memory resource utilization by the instances of the software containers associated with the k software container profiles; and a storage space utilization limit calculated based on historical storage space utilization by the instances of the software containers associated with the k software container profiles.

12. The method of claim 9 wherein a distance between a first software container profile weight for a first software container and a second software container profile weight for a second software container indicates relative functional importance between at least a first application of the first software container and at least a second application of the second software container.

13. The method of claim 1 wherein managing resource utilization of the executing instance of the given software container based at least in part on the resource management plan for the given container comprises:

monitoring resource utilization by the executing instance of the given software container; and dynamically altering resource utilization by the executing instance of the given software container responsive to the monitored resource utilization being outside one or more of the determined set of resource management metric thresholds.

14. The method of claim 13 wherein dynamically altering resource utilization by the executing instance of the given software container comprises at least one of:

allocating additional resources of the container platform to the executing instance of the given software container;

de-allocating resources of the container platform from the executing instance of the given software container; and throttling resource usage by the executing instance of the given software container.

15. A computer program product comprising a non-transitory processor-readable storage medium having stored therein program code of one or more software programs, wherein the program code when executed by at least one processing device causes the at least one processing device to perform steps of:

receiving a request to execute an instance of a given software container;

determining a set of source code entities of source code of the given software container;

generating a given software container profile for the given software container based at least in part on rankings associated with the set of source code entities of the source code of the given software container;

identifying, utilizing one or more machine learning algorithms, one or more additional software containers having associated software container profiles exhibiting at least a threshold level of similarity to the given software container profile;

determining, based at least in part on historical resource utilization data for the identified one or more additional software containers, a set of resource management metric thresholds;

creating a resource management plan for the given software container, the resource management plan comprising the determined set of resource management metric thresholds;

executing the instance of the given software container on a software container platform; and managing resource utilization of the executing instance of the given software container based at least in part on the resource management plan for the given software container.

16. The computer program product of claim 15 wherein a given one of the rankings associated with a given one of the source code entities characterizes functional importance to an enterprise system, and wherein functional importance to the enterprise system is determined based at least in part on at least one of usage of the given source code entity and connectedness of the given source code entity.

17. The computer program product of claim 15 wherein:
the software container profiles associated with the identified one or more additional software containers have respective software container profile weight values within a designated threshold of a given software container profile weight of the given software container profile;

the designated threshold comprises k; and identifying the one or more additional software containers having associated software container profiles exhibiting at least the threshold level of similarity to the given software container profile comprises utilizing a k nearest neighbor machine learning algorithm to identify k software container profiles from a repository of software container profiles, the k software container profiles comprising those software container profiles in the software container profile repository which comprise software container profile weights closest to the given software container profile weight.

18. An apparatus comprising:
at least one processing device comprising a processor coupled to a memory;

the at least one processing device being configured to perform steps of:
receiving a request to execute an instance of a given software container;

determining a set of source code entities of source code of the given software container;

generating a given software container profile for the given software container based at least in part on rankings associated with the set of source code entities of the source code of the given software container;

identifying, utilizing one or more machine learning algorithms, one or more additional software containers having associated software container profiles exhibiting at least a threshold level of similarity to the given software container profile;

determining, based at least in part on historical resource utilization data for the identified one or more additional software containers, a set of resource management metric thresholds;

creating a resource management plan for the given software container, the resource management plan comprising the determined set of resource management metric thresholds;

executing the instance of the given software container on a software container platform; and managing resource utilization of the executing instance of the given software container based at least in part on the resource management plan for the given software container.

19. The apparatus of claim 18 wherein a given one of the rankings associated with a given one of the source code entities characterizes functional importance to an enterprise system, and wherein functional importance to the enterprise system is determined based at least in part on at least one of usage of the given source code entity and connectedness of the given source code entity.

20. The apparatus of claim 18 wherein:
the software container profiles associated with the identified one or more additional software containers have respective software container profile weight values within a designated threshold of a given software container profile weight of the given software container profile;

the designated threshold comprises k; and identifying the one or more additional software containers having associated software container profiles exhibiting at least the threshold level of similarity to the given software container profile comprises utilizing a k nearest neighbor machine learning algorithm to identify k software container profiles from a repository of software container profiles, the k software container profiles comprising those software container profiles in the software container profile repository which comprise software container profile weights closest to the given software container profile weight.

* * * * *